Figure 1:
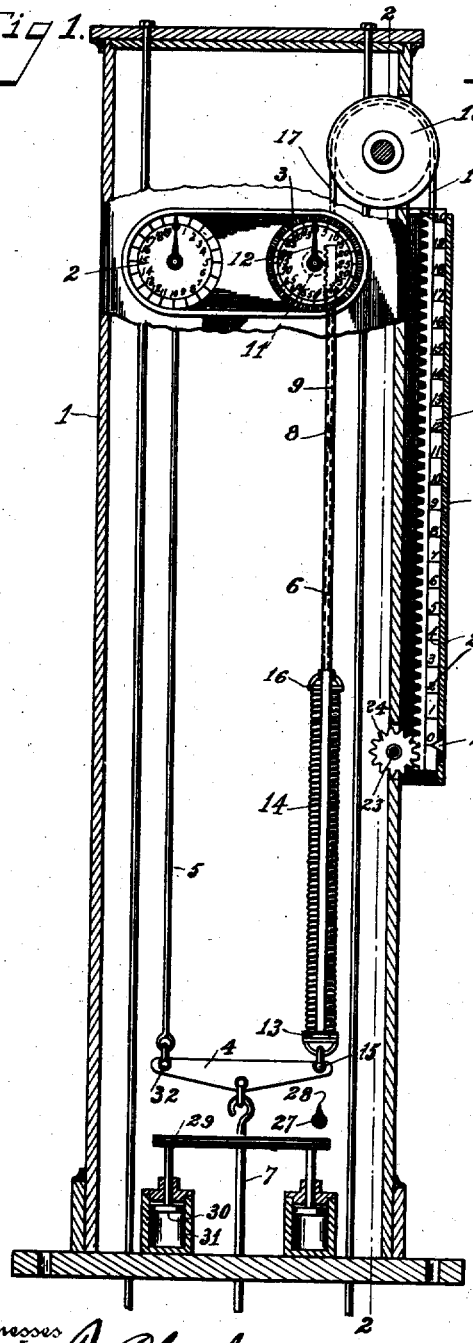

H. B. OSGOOD.

WEIGHING APPARATUS.

APPLICATION FILED MAR. 16, 1910.

Reissued Mar. 7, 1911.

13,216.

6 SHEETS—SHEET 1.

Witnesses

Elmer A. Clarke

Chas. I. Milch

Inventor

Horatio Bonar Osgood

By Staley and Bowman

Attorneys

THE NORRIS PETERS CO., WASHINGTON, D. C.

H. B. OSGOOD.

WEIGHING APPARATUS.

APPLICATION FILED MAR. 16, 1910.

Reissued Mar. 7, 1911.

13,216.

6 SHEETS—SHEET 2.

Inventor

Witnesses

Elmer A. Clarke

Chas. F. Mich

Horatio Bonar Osgood

By Staley and Bowman

Attorneys

THE NORRIS PETERS CO., WASHINGTON, D. C.

H. B. OSGOOD.

WEIGHING APPARATUS.

APPLICATION FILED MAR. 16, 1910.

Reissued Mar. 7, 1911.

13,216.

6 SHEETS—SHEET 3.

Witnesses

Oliver P. Clarke

Chas. J. Milch

Horatio Bonar Osgood Inventor

By Staley and Bowman

Attorneys

THE NORRIS PETERS CO., WASHINGTON, D. C.

H. B. OSGOOD.

WEIGHING APPARATUS.

APPLICATION FILED MAR. 16, 1910.

Reissued Mar. 7, 1911.

13,216.

6 SHEETS—SHEET 4.

Witnesses

Elmer A. Clarke

Elias J. Milch

Inventor

Horatio Bonar Osgood

By Staley & Bowman

Attorneys

THE NORRIS PETERS CO., WASHINGTON, D. C.

H. B. OSGOOD.

WEIGHING APPARATUS.

APPLICATION FILED MAR. 16, 1910.

Reissued Mar. 7, 1911.

13,216.

6 SHEETS—SHEET 5.

Witnesses

Oliver P. Clarke

Chas. J. Mich

Inventor

Horatio Bonar Osgood

By Staley and Bowman

Attorneys

THE MORRIS PETERS CO., WASHINGTON, D. C.

H. B. OSGOOD.

WEIGHING APPARATUS.

APPLICATION FILED MAR. 16, 1910.

Reissued Mar. 7, 1911.

13,216.

6 SHEETS—SHEET 6.

Witnesses

Oliver P. Clarke

Chas. F. Mech

Inventor

Horatio Bonar Osgood

By Staley and Bowman

Attorneys

THE NORRIS PETERS CO., WASHINGTON, D. C.

UNITED STATES PATENT OFFICE.

HORATIO BONAR OSGOOD, OF SPRINGFIELD, OHIO, ASSIGNOR, BY MESNE ASSIGNMENTS, TO THE WINTERS-COLEMAN SCALE COMPANY, OF SPRINGFIELD, OHIO, A CORPORATION OF OHIO.

WEIGHING APPARATUS.

13,216. Specification of Reissued Letters Patent. Reissued Mar. 7, 1911.

Original application filed December 6, 1906, Serial No. 346,571. Renewed August 30, 1907, Serial No. 390,826. Original No. 885,698, dated April 21, 1908. Application for reissue filed March 16, 1910. Serial No. 549,810.

*To all whom it may concern:*

Be it known that I, HORATIO BONAR OSGOOD, a citizen of the United States, residing at Springfield, in the county of Clark and State of Ohio, have invented certain new and useful Improvements in Weighing Apparatus, of which the following is a specification.

This invention relates to improvements in weighing apparatus, and comprises the constructions, combinations and arrangements herein described and claimed.

The prime object of this invention is to provide an improved scale, operating with a minimum amount of friction throughout wide ranges of loads and accurately indicating any load within its capacity; the range of indication being wide, while the indicating area is small.

A further object of this invention, and of the preferred construction shown and illustrated herein, is to provide an improved scale by which any load within its capacity can be quickly and accurately weighed without the necessity of handling weights or of balancing a poise upon a graduated beam.

A further object of this invention is to provide an improved scale having integer and fractional gages, the fractional gage being employed to indicate minor loads, (any load that is within the capacity of the fractional gage) and the fractional portions of major loads within the capacity of the scale. With a major load a counterbalancing device communicating with the fractional gage can be quickly adjusted so that said gage will indicate the fractional part of a major load.

Whenever the terms integer gage and fractional gage are used it is not intended that the said gages must necessarily be separate and distinct, but rather that there be distinct indications in integer and fractional amounts.

Figure 2:
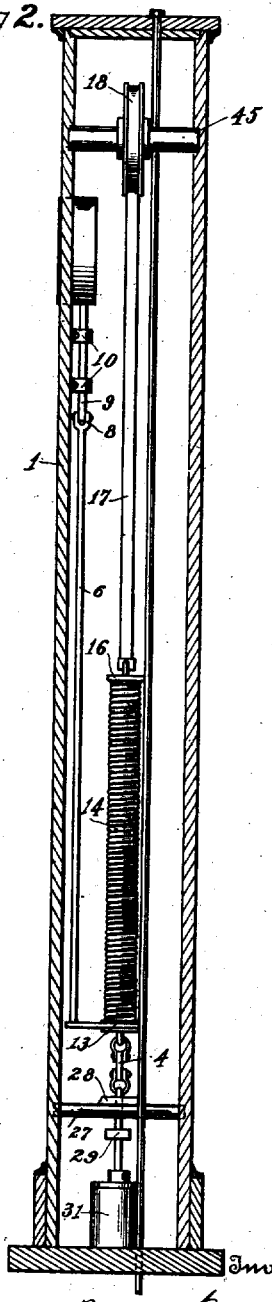
Figure 3:
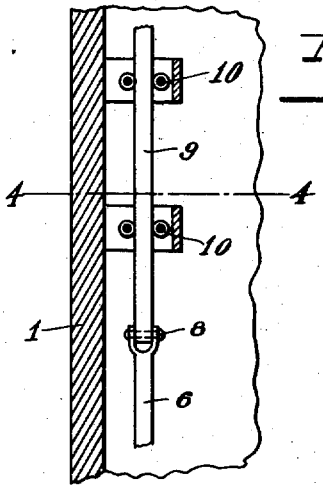
Figure 4:
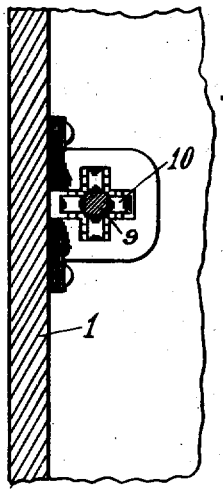
Figure 5:
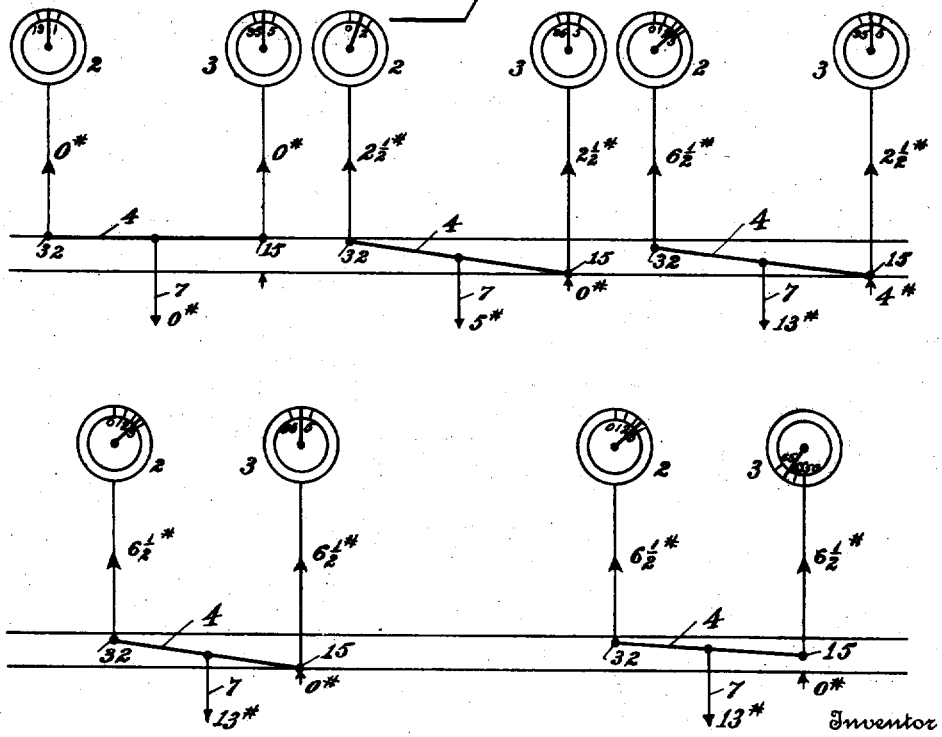
Figure 8:
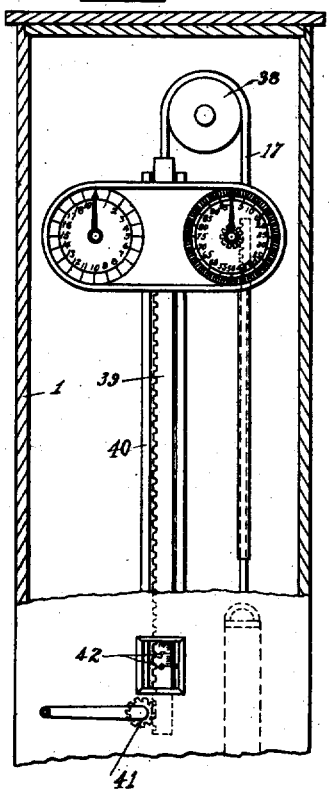
Figure 9:
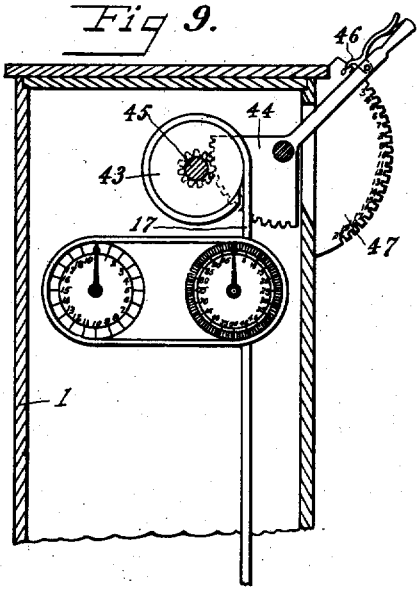
Figure 7:
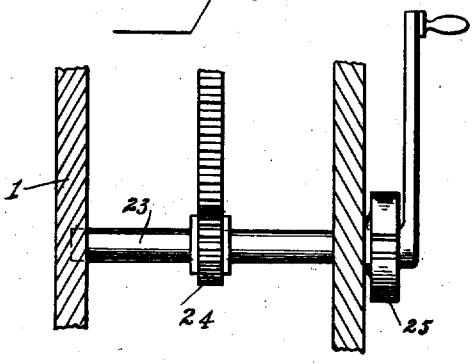
Figure 6:
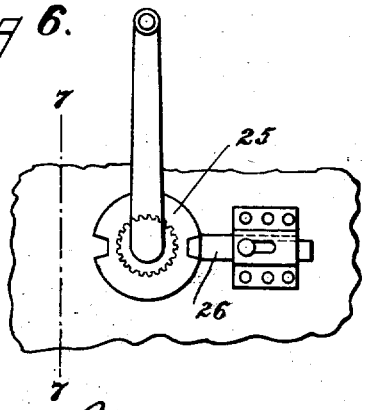
Figure 10:
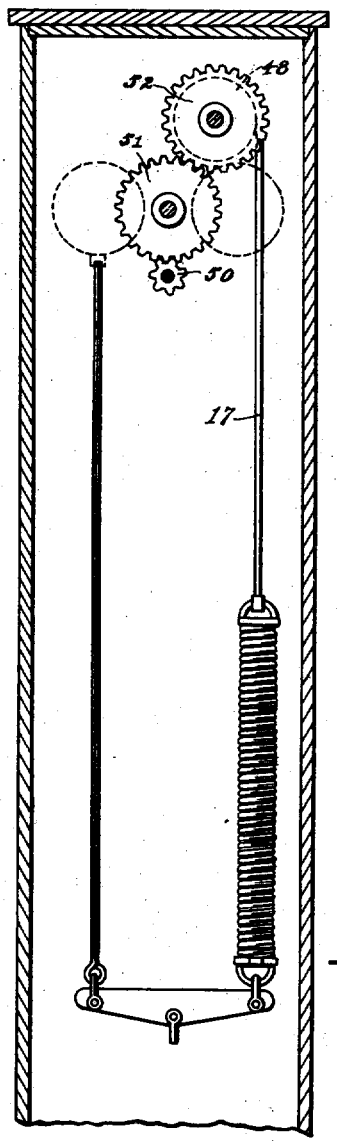
Figure 11:
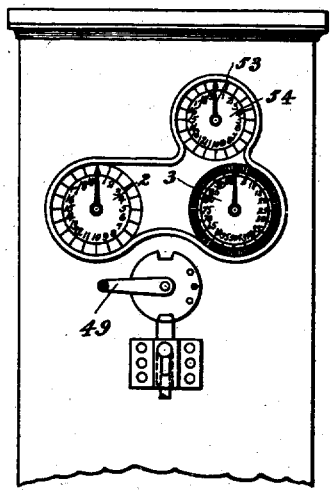
Figure 12:
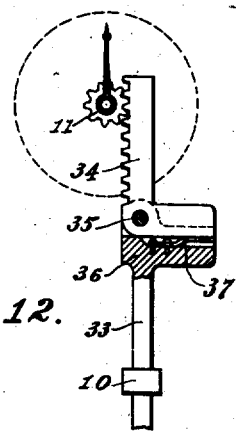
Figure 13:
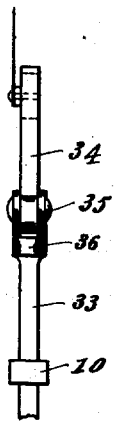
Figure 14:
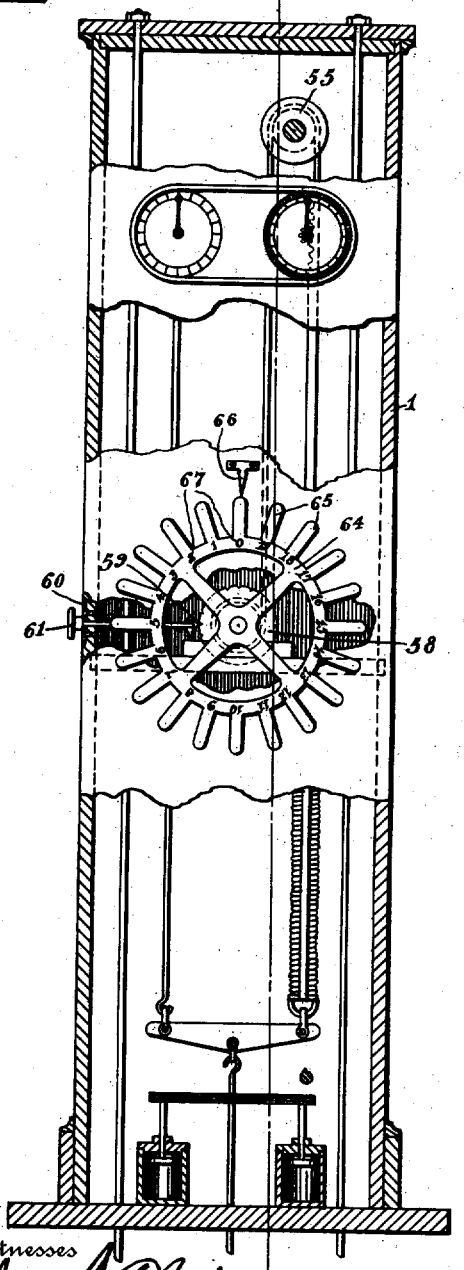
Figure 15:
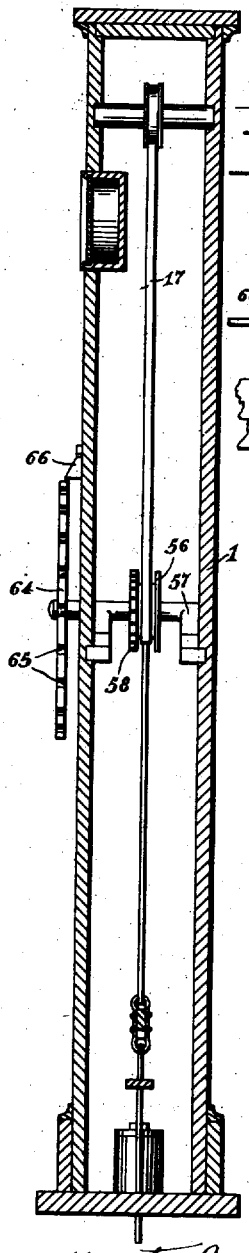
Figure 16:
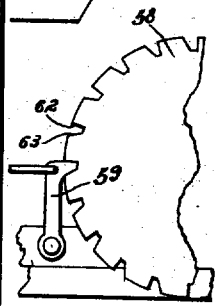
Figure 17:
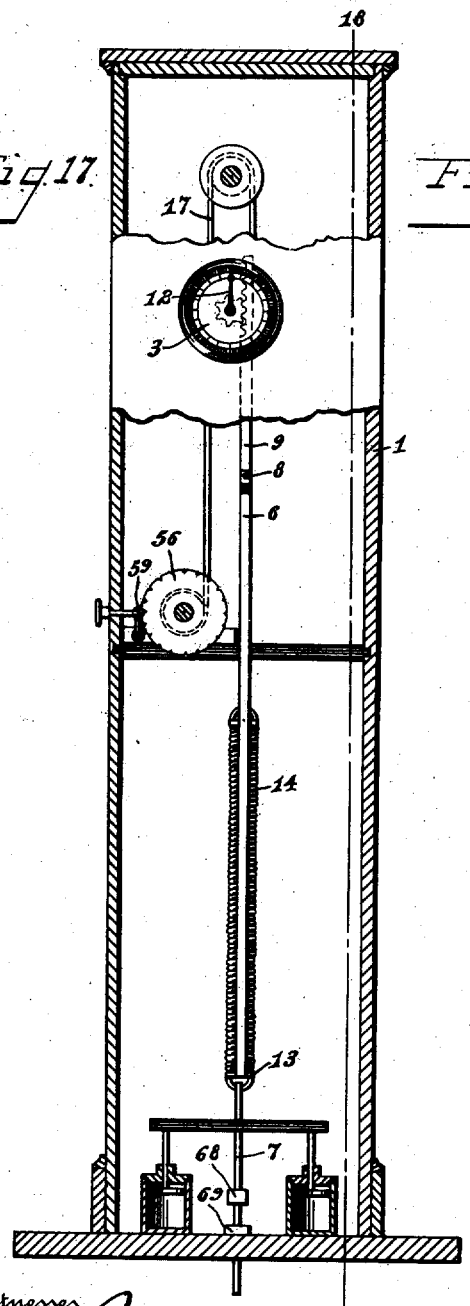
Figure 18:
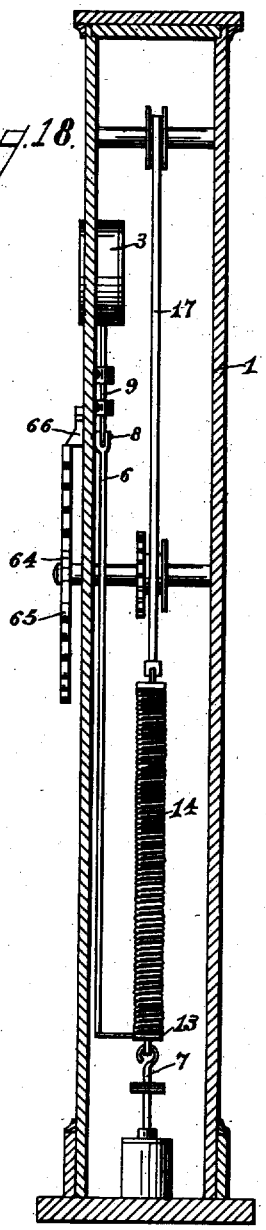

In the accompanying drawings, forming a part of this application, in which similar reference figures indicate corresponding parts in the several views:—Figure 1 is a sectional view with the indicating gages shown in front elevation. Fig. 2 is a sectional view on the line 2—2 of Fig. 1. Fig. 3 is a detail sectional view on a larger scale showing one construction of the rack bar for graduating the fractional gage. Fig. 4 is a sectional view on the line 4—4 of Fig. 3. Fig. 5 shows a series of diagrammatic views showing different positions of the pointer of the gages and their actuating means during the operation of weighing. Fig. 6 is a detail elevation illustrating one means of locking the crank shaft shown in Fig. 1. Fig. 7 is a sectional view on the line 7—7 of Fig. 6. Fig. 8 is a detail sectional view with a portion of the casing broken away illustrating a modified construction of the means for varying the tension of the counterbalancing device, in order to adjust the fractional gage pointer for indicating fractional portions of major loads. Fig. 9 is a similar view illustrating a further modification of said adjusting means. Fig. 10 is a vertical sectional view illustrating a further modification of the connections between the tension device and the fractional gage. Fig. 11 is a front elevation, showing in detail, parts of the modified construction shown in Fig. 10. Fig. 12 is a detail view showing the preferred construction of the rack bar and connections for actuating the fractional gage pointer. Fig. 13 is a side elevation of such construction shown in Fig. 12. Fig. 14 is a sectional view with the casing broken away in part showing a modification of the adjusting means for regulating the tension device. Fig. 15 is a sectional view on line 15—15 of Fig. 14. Fig. 16 is a detail in elevation of the notched disk or dog shown in Fig. 14. Fig. 17 is a sectional view showing the casing broken away, with the fractional gage in front elevation illustrating a modified construction such as dispenses with one of the gages. Fig. 18 is a vertical transverse sectional view on line 18—18 of Fig. 17.

The general principle of operation of this improved weighing apparatus consists in combining a tension or counterbalancing device with a fractional indicating gage, so that any load within the capacity of the machine but beyond the capacity of the fractional gage, will cause parts of the scale or apparatus to assume positions permitting the tension device to be thereafter re-adjusted so as to counterbalance the pressure or pull on the connections to the fractional gage, and cause the indicator of the fractional gage to be moved in a reverse direction from its normal or first movement in order to indicate on said gage the fractional portion of said load. It is also especially desirable to employ an additional gage known as the integer gage, when manually operated means for adjusting the device are employed, in order to indicate to the operator the amount of adjustment necessary in the tension device. It is obvious that it is not necessary to employ a manually operated crank shaft as the means of adjusting the tension device; any ordinary form of adjusting means can be employed. But it is desirable that there be employed indicating devices associated with the adjusting means, relying upon the integer gage serving to indicate to the operator the necessary adjustment. It is obvious that where an integer gage is not employed, the integer indications can be read on the indicating devices shown associated with the operating means for the tension device. With this explanation the construction of parts will be more readily understood.

Referring to the construction shown and described in Figs. 1 to 7 of the drawings: The vertical casing or housing is indicated by figure 1. The integer gage 2, is similar to the gage of an ordinary scale having a tension spring within the casing of the indicator, as is usual in the ordinary form of spring scale. The fractional gage is indicated by 3. The capacity of this gage, as shown, is one hundred (100) lbs. in graduations or units of one (1) lb. The capacity of the integer gage as shown, is two thousand (2000) lbs. in graduations or units of one hundred (100) lbs. It will be obvious that with the small indicating area shown, the weighing of any load up to and including two thousand and ninety-nine (2099) lbs. can be indicated in graduations or units of one (1) lb.

In the preferred construction, shown in Figs. 1 and 2, the traveling link 4 constitutes an intermediate connecting device between the gages and the rod 7 connecting with the weighing levers, usually located at the bottom of the scale. The ends of said link 4 are pivotally connected to rods 5 and 6 which project upwardly, said rod 5 connecting with the integer gage and 6 with the fractional gage said fractional gage registers the amount of movement of the rod 6. The connecting rod 7 happens to be shown pivotally connected to the link 4 at substantially the center thereof. The rod 6 is pivotally connected at the point 8 (see Fig. 1) to a rack bar 9, the teeth of the rack bar being shown in dotted lines at the upper end thereof. This rack bar is shown slidingly supported in roller guides 10 (see Fig. 3) and the teeth are shown in mesh with a pinion 11 (see Fig. 1) secured to the spindle of pointer 12 of the fractional gage. This connecting rod 6 is secured to a stud projecting from the head 13 formed on the lower-most end of the spring 14 (see Fig. 2) and this head 13 is pivotally connected to one end of the link 4 by the stirrup pivoted at 15 (see Fig. 1). The upper head 16, formed at the uppermost end of the spring tension device 14, is connected to a tape or band 17, projecting upwardly and extending over the guide pulley 18 (see Fig. 2). The free end of said tape or band 17 is secured to a rack bar 19, which with its associated parts constitutes the operating device for regulating the tension of the tension device 14, there being associated therewith an indicating device such that the amount of movement necessary may be made in said operating device in accordance with the indication of the integer gage. The rack 19 is slidingly supported in a guide way 20 (Fig. 2) and the index or pointer 21 coöperates with indications marked 22 on said rack bar, representing a desirable form of graduated device, while the shaft 23, suitably journaled in the casing 1, having secured thereto a pinion 24 in mesh with the rack 19, comprises part of the operating device in this preferred construction. In order to lock the shaft 23 in any desired position, there is shown a notched disk 25 and a spring latch 26 located on the front casing of the machine (see Fig. 6), there being two diametrically opposite notches formed on said disk, so that the latch 26 will hold the shaft in two different positions.

As shown in Fig. 1, there is employed a stationary knife edge stop 27 having a knife edge 28 projecting upwardly in the line of travel of the link 4 so that when the link 4 is pulled downwardly by the load pulling on the connecting rod 7, the knife edge 28 will be adapted to form a fulcrum for said link 4 and the link 4 is then converted from a traveling link into weighing lever of the second order, the load happening to be applied at a point substantially at the center and the spring in the integer gage 2 being adapted to counterbalance the additional load, and whenever the opposite moments about the fulcrum are equal, the weighing lever will be in equilibrium and the pointer on the integer gage will indicate in hundred pounds the weight of the load. In this connection, it should be explained that in this particular machine as shown, whenever the load is sufficient to pull the link down to a point such that one end thereof will contact against the knife edge 28 causing the link 4 to be converted into a weighing beam, the pivot 15 by predetermined adjustment will move one inch and a quarter and the indicator pointer 12, on the fractional gage, will make one complete revolution, stopping substantially at zero position. So that in every instance it must be assumed that when a load is placed on the weighing lever sufficient to cause the pointer 12 to make one complete revolution of the dial on the fractional gage, the pivot 15 on the traveling link 4 has moved downwardly a distance of one inch and a quarter, spring 14 being thereby extended one inch and a quarter.

In order to protect the parts of the scale and provide for deadening the action due to a heavy load, there are employed dash pots comprising cylinders 31 filled with suitable liquid such as glycerin and water, the pistons 30 loosely fitted into said cylinder and connected to the cross head 29 which in turn is connected to the rod 7.

Before giving a full explanation of the operation of this invention, it will facilitate the understanding thereof to bear in mind that the tension device 14 can be readily adjusted to counterbalance any pressure due to any load within the capacity of the scale. It will be noted that the indications on the rack 19 correspond with the indications on the page 2, so that when a load operates the pointer 12 of the fractional gage one complete revolution bringing the link 4 against the knife edge 27 and also operates the pointer of the integer gage 2 to an indicating position, the parts are so arranged by predetermined adjustment that the tension device 14 can be quickly brought into proper counter balancing position by manipulating the shaft 23 until a corresponding indicating point on the rack 19 is brought in register with the index or pointer 21. The theory of operation is that the load on the weighing levers, producing a downward pull on one end of the link 4 against knife edge stop 27 can be counterbalanced by an upward pull of the tension device 14. The tension device 14 is normally inactive, but the movement of parts to a position such that the end of link 4 contacts against knife edge 28 will extend the spring so it will exert two and one half ($2\frac{1}{2}$) pounds pull and it is further capable of being extended to produce an additional pull to counter balance an additional load of nineteen hundred (1900) pounds, it being constructed so that an extension of every inch will exert two pounds of pull on the end of said link 4. The parts are also so adjusted that a hundred (100) pound load on the weighing levers will transmit a pressure of five (5) pounds on rod 7 and this pressure happens to be equally divided by link 4 so that there will be a downward pull of two and one half ($2\frac{1}{2}$) pounds on rod 5 and the same pull on rod 6. This downward pull of two and one half ($2\frac{1}{2}$) pounds will cause the pointer 12 of the fractional gage to make a complete revolution bringing the link 4 to a position where one end thereof will contact against the stationary knife edge stop 27 and any additional load on the weighing levers will merely swing the link 4 on its fulcrum, formed by the knife edge stop 27. The shaft 23 and pinion 24 are so associated with the rack bar 19 that one complete revolution of the shaft 23 will bring the indication marked 2 opposite the index 21 and two revolutions of the shaft 23 will bring the indicating point 4 opposite the index 21, so that if the integer pointer is brought by any unkonwn load to a point on the dial of said gage to indicate 2 or intermediate 2 and 3 it will only be necessary to turn shaft 23 one revolution in order to bring the corresponding indication 2 opposite the index 21. The arrangement is such that when rack bar 19 is set at 2 the spring 14 is thereby adapted to counter balance a maximum load of three hundred (300) pounds and at 3 a maximum load of four hundred (400) pounds.

Now applying a concrete example, we may assume that a load of one hundred (100) pounds on the weighing lever has brought the link 4 to a position where one end will contact against knife edge 28, the pivot 15 on said link will have traveled a distance of one and one quarter inches and said link will have been converted into a weighing lever with the knife edge as its fulcrum. In this scale for every pound of pull on the connecting rod 7 the pivotal point 32 of the traveling link 4 will be drawn down one-eightieth of an inch, so that in the concrete example at hand having in mind that the weight of a load is divided to the scale on the basis of twenty to one the pivotal point 32 will have traveled five-eightieths or one sixteenth of an inch, and the pointer of the integer gage will have moved to indicate one and the pointer on the fractional gage will substantially have made one complete revolution and stopped at zero. Referring to Fig. 5 showing five successive positions assumed by the dial pointers of the gages, the first of these positions illustrates the parts in their unloaded position and the second illustrates the position of the parts in the concrete example just mentioned, the scale platform having been loaded one hundred (100) pounds. Now let us assume that the load has been increased to two hundred and sixty (260) pounds or in other words there has been an increase of one hundred and sixty (160) pounds to the initial load. The knife edge stop 27 will prevent any further movement of the end of the part 4 which operates the pointer to the fractional gage. Hence this pointer will remain at zero and the increase of one hundred and sixty (160) pounds will operate part 4 as a lever of the second order. Due to the increase of one hundred and sixty (160) pounds there will be transmitted by rod 7 an additional pull of eight (8) pounds, making a total of thirteen pounds so transmitted, four pounds thereof, being due to the initial load of one hundred (100) pounds. This pull of thirteen pounds will be divided equally by part 4 between the pivots 15 and 32, six and one half ($6\frac{1}{2}$) pounds will be transmitted through pivot 32 to rod 5, of the six and one half ($6\frac{1}{2}$) pounds transmitted through pivot 15, two and one half ($2\frac{1}{2}$) pounds has been required to bring the end of part 4 down to knife edge 28, as previously explained, and the balance, four pounds, will be a dead pull against knife edge 28. The pointer of the fractional gage will remain at zero because the knife edge stop 27 prevents the end of the link 4 with which this pointer is connected from further movement and the one hundred and sixty (160) pound load will now operate part 4 as an ordinary weighing lever of the second order. In this position of parts indicated in third diagrammatical view of Fig. 5, there will be transmitted to rod 7 an additional pressure of eight pounds, there having been an initial pressure of five pounds due to the initial load of one hundred (100) pounds so that the total pull of the rod 7 will be thirteen pounds and this pull will be divided equally by part 4 between the pivots 32 and 15, there now being a downward pull of six and one half pounds on the rod 5 and at the pivot 15 there will be a dead pressure downward of four pounds pressing against the stationary knife edge 28, it being remembered that it has taken two and one half of the six and one half pounds to bring the pivot 15 against the knife edge 28. The pivot 32 will be swung downward to a point thirteen-eightieths of an inch below the original unloaded position and by reason of the fact that the pointer of the integer gage is so arranged that it will move one division for each one hundred (100) pounds, the pointer will necessarily have moved to a point between the divisions 2 and 3. See the third of the diagrammatical views, Fig. 5 which shows the position of the various parts at this stage of the operation. The position of the integer pointer will indicate to the operator at once that to counter balance the downward pull due to the load on the platform the operating means must be manipulated so that the indicating point 2 on the rack 19 will be brought opposite index 21. This is accomplished by rotating the shaft 23 one complete revolution.

The parts are so arranged by predetermined adjustments that one complete revolution of shaft 23 may cause a maximum extension of spring 14 two and one half inches and thereby a maximum pressure equal to five pounds that will be sufficient to counterbalance any maximum limit of load on weighing levers of three hundred (300) pounds. But in the concrete example at hand the spring will only be extended two inches to provide enough pressure to counterbalance the downward pressure due to two hundred and sixty (260) pound load, leaving one half inch movement to provide for the fractional indication, whereas with a load of three hundred (300) pounds the effect would have been to extend the spring two and one half inches leaving the fractional gage indicator at zero. In the example at hand with a load of two hundred and sixty (260) pounds the first two inches through which the head 16 is raised will have no effect on the lower cap 13, but will simply extend the spring 14 two inches, and this by predetermined arrangement will cause an upward pull of four pounds on cap 13 and pivot 15, corresponding now with the fourth diagrammatical view of Fig. 5, there being a total tension of six and one half pounds in the spring, four pounds being due to the upward movement of two inches of the cap 16 and two and one half pounds due to the initial movement downward of cap 13. The remaining half inch elevation of cap 16 will cause a half inch upward movement of pivot 15 and this half inch elevation of pivot 15 constitutes two-fifths of the previous inch and a quarter total depression of the pivot and, as it took an inch and a quarter movement to give the pointer of the fractional gage a complete revolution in one direction, this one half inch movement will reverse the pointer two fifths of a revolution, in other words forty divisions, thereby leaving indicator pointer at the division sixty, so that the operator will read two hundred (200) pounds on the integer dial, or on the indicating mechanism connected with the operating device 23—24, and on the fractional gage he will get a clear indication of sixty (60) pounds.

The example selected for the above illustration was of course arbitrary, but it serves to bring out the salient features of this machine in the arrangement of a counterbalancing tension device with a fractional gage and means for varying the tension of said counterbalancing device so that it will adapt itself to a series of intermediate limits within the capacity of the scale and having connections to the fractional gage such that that gage will indicate the minor load or the minor portion of a major load. In other words, if the tension device is set to counter balance an intermediate limit of three hundred (300) pounds and the actual load is only two hundred and sixty (260) pounds the fractional gage will move to indicate the difference *i. e.* move reversely forty divisions which will leave the indicator of the fractional gage at sixty pounds.

Figs. 12 and 13 illustrate a preferred construction of the rack bar for actuating the fractional gage pointer. In this construction the rod 6 is pivotally connected to a bar 33 reciprocatingly mounted in the roller guides 10 previously described. A rack bar, and a spring 37 is positioned within a recess in said head 36 for yieldingly maintaining said rack bar in mesh with the pinion 11 secured to the pointer of the fractional gage. This construction minimizes the friction and eliminates all danger of binding between the engaging parts.

Fig. 8 illustrates a slightly modified means for manually adjusting the traveling link 4 for operating the fractional gage pointer. In this modification, the steel tape 17 passes over a guide pulley 38 and is secured to the upper end of a rack bar 39 reciprocatingly mounted in guides 40 within the casing 1. The rack bar 39 is shifted by means of a pinion 41 and provided with index marks 42, all in a manner similar to that described in reference to the construction shown in Fig. 1.

Fig. 9 shows a modification in which the steel tape 17 is secured to a drum 43. A toothed segment 44, is arranged in mesh with a pinion 45 secured on the drum shaft, for actuating said drum; said segment carrying a spring latch 46 coöperating with a quadrant 47 provided with suitably spaced and indexed notches for determining the extent of operation of the drum.

Figs. 10 and 11 illustrate a modification in which the steel tape 17 is secured on a drum 48, which latter is rotated by a crank shaft 49 through a train of gears 50, 51 and 52. A pointer 53 is secured to the shaft of one of said gears to coöperate with a dial face 54 for accurately indicating the extent of rotation given to the drum 48.

Figs. 14 and 15 illustrate my preferred means for manually adjusting the traveling link 4 for operating the fractional gage pointer. In this modification, the steel tape 17 passes over a guide pulley 55 and is secured to a drum 56 rotatably mounted in bearings 57 carried by the casing 1. A disk 58, secured to said drum, is provided with a series of notches corresponding to the number of divisions on the integer gage 2. A suitable spring dog 59 is normally maintained by a spring 60 in position to engage the notches of the wheel 58, for locking said wheel and its attached drum 56 against rotation; a manually operated handle 61 being conveniently positioned for retracting the dog from engagement with the notched drum.

Fig. 16 shows a construction adapted to lock the drum 56 against reverse rotation while permitting free forward rotation of said drum for winding up thereon the steel tape 17. In this construction the notches in the disk 58 are formed with substantially radially extending forward faces 62 and with inclined rear faces 63; the engaging faces of the dog being similarly formed. A hand wheel 64 is secured to the shaft of the drum 56 exterior to the front face of the casing 1; said hand wheel being provided with a series of peripheral extensions 65 which constitute convenient handles for rotating the wheel and also act as pointers coöperating with an index 66 fixed on the casing 1. The hand wheel 64 is provided with a series of successively numbered indexes 67, corresponding in angular position and number to the notches in the disk 58.

From the above description, it will be seen that my preferred construction provides a strong and satisfactory means, in convenient position for access by the operator from either side of the scale platform. Further, the relation between the radii of the drum 56 and of the operating handle 65 enables said drum to be readily and easily rotated for extending the spring 14, since the tension on said spring will not exceed approximately 65 pounds when the scale is loaded to its full capacity.

Figs. 17 and 18 illustrate a modified construction, in which the integer gage and its connections are entirely dispensed with; the lower head 13 of the spring 14 being pivotally connected directly to the connecting rod arrangement of weighing levers. The construction of the fractional gage and of the connections between said dial and the lower head 13 are exactly similar to those described in reference to Figs. 1 and 2, and a further description thereof would be mere repetition. A drum mechanism 56, 58 and hand wheel 64, similar to that described, with reference to Figs. 15 and 16, is provided for winding up the steel tape 17 for extending the spring 14. A stop 68 is carried by the connecting rod 7 in position to engage a fixed stop 69 upon depression of said connecting rod during its normal position in the unloaded condition of the scale to its engagement with the fixed stop 69, is so proportioned that the lower head 13 will be depressed sufficiently to cause one revolution of the fractional gage pointer 12 when said stop 68 is depressed into engagement with the fixed stop 69; further the normal distance between the stops 68 and 69, in the unloaded condition of the scale, is exactly equal to the length of the steel tape 17, which is wound on the drum 56 during the rotation of said drum through the angle subtended by any two adjacent notches on the wheel 58 secured to said drum. In describing the operation of this modified construction, it will be assumed, for the sake of clearness, that a load of one hundred (100) pounds on the scale platform will depress the stop 68 to engagement with the fixed stop 69, and thereby cause one revolution of the pointer 12 of the fractional gage 3; any loading of the platform scale in excess of one hundred (100) pounds acting merely to increase the pressure of the stop 68 against the fixed stop 69. Thus, when any load in excess of one hundred (100) pounds has been placed on the platform of the scale, the fractional gage pointer will be shifted around one revolution and there remain stationary. The operator will then turn the hand wheel 64 until the gage pointer begins to move in a reverse direction, and will then cease such movement of the hand wheel when the next succeeding notch thereafter in the disk 58 has been brought into engagement with the spring dog 59. This operation of the hand wheel 64 will cause the gage pointer 12 to indicate the fractional portion of the load, in a manner similar to that previously described in the operation of the construction shown in Figs. 1–5. The integer portions of the load will be read directly from that one of the series 67 of index numbers on the hand wheel which has been brought into registry with the fixed index 66 by such operation of said hand wheel. As a specific example, with a load of two hundred and sixty (260) pounds on the scale platform, it will be found that the rotation of the hand wheel 64 to produce a reverse movement of the gage dial pointer 12 will bring the index number 2 on said hand wheel in register with the fixed index 66; and that the gage pointer 12 will be carried by its reverse rotation to the division on its dial indicating sixty (60) pounds. It will be obvious that where the scale platform is loaded to an extent less than one hundred (100) pounds, the weight of said load will be indicated directly on the fractional dial; there being no necessity for actuation of the hand wheel 64 by the operator.

Having described the invention it is claimed, as follows:

1. In a machine of the character described, the combination of a fractional gage and a tension device and means for increasing by predetermined fixed amounts the tension of said device during the operation of the machine to adapt it to a series of intermediate limits within the capacity of the machine, a load support and connection between said load support and said tension device, and connections to said gage to cause it to indicate the fractional difference between a particular limit and the actual weight of the load being weighed.

2. The combination of a fractional gage and a tension spring, means for increasing the tension thereof and means for thereafter holding said spring to adapt it to a series of intermediate limits within the capacity of the machine and indicating devices associated with said means for indicating the integer amount of said series of limits, a load support and connection between the spring and said support, connections to the fractional gage for causing it to indicate the fractional part of any load, substantially as specified.

3. The combination of a fractional gage with a tension spring, adjusting means for increasing the tension of said device to adapt it to a series of intermediate limits within the capacity of the machine, and an additional gage for indicating the integer amount of any load, a load support and connections between said support and spring, indicating devices graduated with divisions corresponding to said additional gage, connected to said adjusting means, connections from the tension device to said fractional gage for causing said gage to indicate the fractional part of any load.

4. In a machine of the character described, the combination of a fractional gage and a tension device, means for varying the tension of said device without the employment of additional tension devices during the operation of the machine to adapt it to varying loads within a series of intermediate limits within the capacity of the machine, a load support and connections between said support and said tension device, and connections to said fractional gage to cause it to indicate the difference between a particular limit and the actual load being weighed, for the purpose specified.

5. In a machine of the character described, the combination of a fractional gage and a tension spring, means for increasing by predetermined fixed amounts the tension of said spring during the operation of the machine to adapt it to loads within a series of intermediate limits, and means for indicating the particular limit to which the said device is to be adjusted to adapt it to the load being weighed, a load support and connection between said support and said springs, and connections to said gage to cause it to indicate the difference between the particular limit and the actual load being weighed, for the purpose specified.

6. In a machine of the character described, the combination of a fractional gage and a counterbalancing device of variable capacity, rotatable means for setting the capacity of said counterbalancing device by increasing its capacity by fixed predetermined amounts during the operation of said machine to adapt it to varying loads within a series of intermediate limits, a load support and connections between said support and said counterbalancing device, and connections to said gage, whereby the gage will indicate the difference between one of said intermediate limits and the actual load being weighed, for the purpose specified.

7. In a scale, the combination of independent gages, actuating means for operating both of said gages during initial loading of the scale, shifting means for adjusting said actuating means to operate the other of said gages, and manually operated means for actuating said shifting means at any load within the capacity of the scale, substantially as described.

8. In a scale, the combination of independent gages, actuating means for operating certain of said gages during loading of the scale throughout its full capacity, shifting means for adjusting said actuating means to operate the other of said gages, manually operated means for actuating said shifting means at any load within the capacity of the scale, and means for indicating the extent of movement of said shifting means substantially as described.

9. In a scale, the combination of a traveling link, a pair of gages, connections between said traveling link and gages, means for converting said link into a weighing beam at a predetermined loading of the scale, and shifting means for re-converting said link from a beam to a traveling link, substantially as described.

10. In a scale, the combination of a traveling link, a connecting rod for actuating said link, a pair of gages, connections between said traveling link and gages, for converting said link into a weighing beam at a predetermined loading of the scale, and shifting means for adjusting said link to re-convert it from a beam to a traveling link, substantially as described.

11. In a scale, the combination of a traveling link, a pair of gages, connections between said traveling link and gages, means for converting said link into a weighing beam at a predetermined loading of the scale, shifting means for re-converting said link from a beam to a traveling link, and manually operated means for actuating said shifting means at any load within the capacity of the scale, substantially as described.

12. In a scale, the combination of a traveling link, a pair of gages, connections between said traveling link and gages, means for converting said link into a weighing beam at a predetermined loading of the scale, shifting means for re-converting said link from a beam to a traveling link, and deadening devices carried by said traveling link for preventing oscillations of said gages, substantially as described.

13. In a scale, the combination of a traveling link, a pair of gages, connections between said traveling link and gages, means for converting said link into a weighing beam at a predetermined loading of the scale, shifting means for re-converting said link from a lever to a traveling link, and means for indicating the extent of movement of said shifting means, substantially as described.

14. In a scale, the combination of an integer gage provided with divisions indicating units, a fractional gage indexed to indicate fractional parts of said units, means for actuating both of said gages during the initial loading of the scale to the extent of one of the units of said integer gage, means for automatically locking said fractional gage from action during further loading of the scale, and manually operated means for causing a reverse actuation of said fractional gage to indicate fractional unit parts of the scale loading, substantially as described.

15. In a scale, the combination of an integer gage, provided with divisions indicating units, a fractional gage indexed to indicate fractional parts of said units, means for actuating both of said gages during the initial loading of the scale to the extent of one of the units of said integer gage, means for automatically locking said fractional gage from action during further loading of the scale, manually operated means for causing a reverse actuation of said fractional gage to indicate fractional unit parts of the scale loading, and means for indicating the extent of movement of said manually operated means, substantially as described.

16. In a scale, the combination of an integer gage provided with divisions indicating units, a fractional gage indexed to indicate fractional parts of said units, a traveling link, a rod connecting said link, and integer gage, means connected to said link for actuating said fractional gage, a stop in the path of said traveling link for engaging said link to lock the actuating means of said fractional gage against operation while permitting uniform actuation of said integer gage, and manually-operated means connected to said traveling link for producing a reverse action of said fractional gage to indicate the fractional unit parts of the scale loading, substantially as described.

17. In a scale, the combination of a traveling link, a pair of gages, connections between said traveling link and gages, means for converting said link into a weighing beam at a predetermined loading of the scale, a resilient connection to said traveling link, and shifting means for adjusting said resilient connection, to reconvert said link from a beam to a traveling link, substantially as specified.

18. In a scale, the combination of an integer gage provided with divisions indicating units, a fractional gage indexed to indicate fractional parts of said units, a common actuating means for said gages, manually operated means for adjusting said fractional gage to indicate fractional unit parts of any scale loading with the capacity of said scale, a series of indexes corresponding to the divisions of said integer scale for determining the extent of operation of said manually operated means, substantially as described.

19. In a scale, the combination of an integer gage provided with divisions indicating units, a fractional gage indexed to indicate fractional parts of said units, a common actuating means for said gages, means for locking the fractional gage from actuating during loading of the scale in excess of said gage's capacity, manually-operated means for adjusting said fractional gage to indicate fractional unit parts of the scale loading, and a series of indexes corresponding to the divisions of said integer scale for determining the extent of operation of said manually-operated means, substantially as described.

20. In a scale, the combination of an integer gage provided with divisions indicating units, a fractional gage indexed to indicate fractional parts of said units, a common actuating means for said gages, means for locking the fractional gage from actuation during loading of the scale in excess of said gage's capacity, manually-operated means for adjusting said fractional gage to indicate fractional unit parts of the scale loading, and a series of indexes on said manually-operated means corresponding to the divisions of said integer scale, substantially as described.

21. In a scale, the combination of independent gages, a common actuating means for operating both of said gages during initial loading of the scale, a resilient connection to said common actuating means, and manually-operated means for actuating said resilient connection to operate the other of said gages, substantially as described.

22. In a scale, the combination of an integer gage provided with division indicating units, a fractional gage indexed to indicate fractional parts of said units, a common actuating means for said gages, means for locking said fractional gage from actuation during loading of said scale in excess of said gage's capacity, a resilient connection to said common actuating means, and manually-operated means for actuating said resilient connection to shift said common actuating means for adjusting said fractional gage to indicate fractional unit parts of the scale loading, substantially as described.

23. In a scale, the combination of a fractional gage having a capacity less than that of the scale, connections between said scale and gage for actuating the latter during loading of the scale throughout the capacity of said gage, and manually-operated means for adjusting said fractional gage to indicate fractional parts of any scale loading within the capacity of said scale, substantially as described.

24. In a scale, the combination of a gage, having a capacity less than that of the scale, connections between said scale and gage for actuating the latter during initial loading of the scale, and manually operated means for indicating the proportion of the load corresponding to integer multiples of the capacity of said gage, substantially as described.

25. In a scale, the combination of a gage having a capacity less than that of the scale, connections between said scale and gage for actuating the latter during initial loading of the scale throughout the capacity of said gage, means for automatically locking the gage against actuating during loading of the scale in excess of said gage's capacity, and manually-operated means for indicating the proportion of the load corresponding to integer multiples of the capacity of said gage, substantially as described.

26. In a scale, the combination of a gage having a capacity less than that of the scale, connections between said scale and gage for actuating the latter during initial loading of the scale throughout the capacity of said gage, means for automatically locking the gage against actuating during loading of the scale in excess of said gage's capacity, and manually-operated means for indicating the proportion of the load corresponding to integer multiples of the capacity of said gage and for actuating said gage to indicate the proportion of the load corresponding to a weight less than the capacity of said gage, substantially as described.

27. In a machine of the character described, the combination of a load support, a fractional gage and an integer gage, and a counterbalancing device, and means connecting said support with said gages and with said counterbalancing device, and means for adjusting said counterbalancing device after the load is indicated on said integer gage, substantially as specified.

28. In a machine of the character described, the combination of load support and a fractional gage with a self contained counterbalancing device, and connections between said support and said counterbalancing device and means for setting the capacity of the counter-balancing device to a series of predetermined intermediate limits without the employment of additional counter-balancing, and connections to said gage whereby said gage will indicate the fractional difference between the particular limit and the actual weight of the load, substantially as specified.

In witness whereof, I hereunto subscribe my name this 2nd day of March, 1910.

HORATIO BONAR OSGOOD.

Witnesses:
B. H. WINTERS,
CHAS. I. WELCH.

Copies of this patent may be obtained for five cents each, by addressing the "Commissioner of Patents, Washington, D. C."